US008577779B2

(12) United States Patent
Kalt

(10) Patent No.: US 8,577,779 B2
(45) Date of Patent: Nov. 5, 2013

(54) SYSTEM AND METHODS FOR FACILITATING INFORMED TRADING OF FINANCIAL INSTRUMENTS

(75) Inventor: David S. Kalt, Glencoe, IL (US)

(73) Assignee: optionsXpress Holdings, Inc., Chicago, IL (US)

( * ) Notice: Subject to any disclaimer, the term of this patent is extended or adjusted under 35 U.S.C. 154(b) by 575 days.

(21) Appl. No.: 11/542,098

(22) Filed: Oct. 3, 2006

(65) Prior Publication Data

US 2007/0078745 A1 Apr. 5, 2007

Related U.S. Application Data

(60) Provisional application No. 60/723,829, filed on Oct. 5, 2005.

(51) Int. Cl.
*G06Q 40/00* (2012.01)
(52) U.S. Cl.
USPC ............................. 705/37; 705/35; 705/36 R
(58) Field of Classification Search
USPC ........................................... 705/1, 35, 36, 37
See application file for complete search history.

(56) References Cited

U.S. PATENT DOCUMENTS

| | | | |
|---|---|---|---|
| 3,573,747 A | 4/1971 | Adams | |
| 3,581,072 A | 5/1971 | Nymeyer | |
| 4,412,287 A | 10/1983 | Braddock | |
| 4,674,044 A | 6/1987 | Kalmus et al. | |
| 4,953,085 A | 8/1990 | Atkins | |
| 5,077,665 A | 12/1991 | Silverman et al. | |
| 5,136,501 A | 8/1992 | Silverman | |
| 5,168,446 A | 12/1992 | Wiseman | |
| 5,220,500 A | 6/1993 | Baird et al. | |
| 5,297,031 A | 3/1994 | Gutterman | |
| 5,297,032 A | 3/1994 | Trojan et al. | |
| 5,523,942 A | 6/1996 | Tyler | |
| 5,557,517 A | 9/1996 | Daughterty, III | |
| 5,671,363 A | 9/1997 | Cristofich et al. | |
| 5,715,402 A | 2/1998 | Popolo | |
| 5,727,165 A | 3/1998 | Ordish et al. | |
| 5,794,207 A | 8/1998 | Walker et al. | |
| 5,864,828 A | 1/1999 | Atkins | |
| 5,905,974 A | 5/1999 | Fraser et al. | |
| 5,913,202 A | 6/1999 | Motoyama | |
| 5,918,217 A | 6/1999 | Maggioncalda et al. | |
| 5,963,923 A | 10/1999 | Garber | |

(Continued)

OTHER PUBLICATIONS (WO/2007/044364) System and Methods for Facilitating Informed Trading of Financial Instruments, International Preliminary Report on Patentability Chapter I, http://www.wipo.int/pctdb/images4/PATENTSCOPE/85/31/07/003107.pdf, Sep. 13, 2007.*

*Primary Examiner* — Olabode Akintola
*Assistant Examiner* — Kellie Campbell
(74) *Attorney, Agent, or Firm* — Valauskas Corder LLC

(57) ABSTRACT

The invention relates to an improved means for interactive computerized communications having a facilitated capability for order entry and order execution, and providing an enhanced range of trading forms and methods to clients of brokerage firms dealing in financial instruments. In particular, the invention relates to a type of interactive computerized system and software program providing services based from trading patterns, to result in a more efficient and flexible range in the type of allowable trades, and that provides thereby innovative and strategic advantages to individual investors of brokerage firms, for actively managing financial instruments held in trading accounts.

3 Claims, 12 Drawing Sheets

(56) References Cited

U.S. PATENT DOCUMENTS

| | | | |
|---|---|---|---|
| 6,012,044 A | 1/2000 | Maggioncalda et al. | |
| 6,014,643 A | 1/2000 | Minton | |
| 6,018,722 A | 1/2000 | Ray et al. | |
| 6,021,397 A | 2/2000 | Jones et al. | |
| 6,035,287 A | 3/2000 | Stallaert | |
| 6,049,783 A | 4/2000 | Segal et al. | |
| 6,085,169 A | 7/2000 | Walker et al. | |
| 6,108,639 A | 8/2000 | Walker et al. | |
| 6,134,534 A | 10/2000 | Walker et al. | |
| 6,173,270 B1 | 1/2001 | Cristofich et al. | |
| 6,195,647 B1 | 2/2001 | Martyn et al. | |
| 6,236,980 B1 | 5/2001 | Reese | |
| 6,269,346 B1 | 7/2001 | Cristofich et al. | |
| 6,272,528 B1 | 8/2001 | Cullen et al. | |
| 6,278,982 B1 | 8/2001 | Korhammer et al. | |
| 6,285,989 B1 | 9/2001 | Shoham | |
| 6,317,783 B1 | 11/2001 | Freishtat et al. | |
| 6,343,278 B1 | 1/2002 | Jain | |
| 6,360,210 B1 | 3/2002 | Wallman | |
| 6,408,282 B1 * | 6/2002 | Buist | 705/36 R |
| 6,418,419 B1 | 7/2002 | Nieboer et al. | |
| 6,601,044 B1 | 7/2003 | Wallman | |
| 6,615,188 B1 | 9/2003 | Breen | |
| 6,618,707 B1 | 9/2003 | Gary | |
| 7,330,831 B2 | 2/2008 | Biondi | |
| 2001/0042040 A1 | 11/2001 | Keith | |
| 2001/0044770 A1 | 11/2001 | Keith | |
| 2001/0051909 A1 | 12/2001 | Keith | |
| 2002/0004776 A1 | 1/2002 | Gladstone | |
| 2002/0091617 A1 | 7/2002 | Keith | |
| 2002/0116311 A1 | 8/2002 | Chalke et al. | |
| 2002/0156722 A1 | 10/2002 | Greenwood | |
| 2002/0188552 A1 | 12/2002 | Kacounas et al. | |
| 2003/0009411 A1 | 1/2003 | Ram et al. | |
| 2003/0110120 A1 * | 6/2003 | Salehi | 705/37 |
| 2003/0167224 A1 | 9/2003 | Periwal | |
| 2003/0208432 A1 * | 11/2003 | Wallman | 705/36 |

* cited by examiner

| Stock | Extended Hours | |
|---|---|---|
| Stock Symbol | DIA | Find Symbol |
| Action | Buy ▼ | |
| Quantity | 100 | ⊙ Shares ○ $ Amount <u>All or None</u> ☐ |
| Price | ⊙ Market | |
| | ○ Limit $ ☐ | |
| | ▲ | |
| | ▼ | |
| | ○ Stop $ ☐ | |
| | ▲ | |
| | ▼ | |
| | ○ Stop Limit | |
| | ○ Market On Close | |
| Duration | Day Order ▼ | |
| Routing | Default ▼ | |
| Advanced Orders | None ▼ | |
| | Preview Order | | optionsXpress | Trade Confirmation optionsXpress®
Online Options & Stock Brokers

Real Markets, Fake Money. Try It

» Open Another Account    🔒 LOG OFF   ❓LIVE HELP

[Search]

Page 1 of 1

| Welcome | Account | Trade | Quotes | Toolbox | Educate | Help |

Stock | Options | Xspreads | Covered Calls | Futures | Mutual Funds | Bonds | Order Status

Stock Trade Placed

Thank You. Your order has been received and submitted.

Order #29416882
Please record this order number for your records. The order number is a unique number that should be referenced when communicating with us.

Order Time
9/25/2006 5:07:58 PM ET

[ Place Another Trade ]   [ Check Order Status ]

What Next?
- View Your Positions
- Check Your Balances
- Manage Your Watch Lists 👥 People trading QQQQ also traded
See Results...

Get 3 Free Trades
Refer a friend and receive your choice of a free book, optionsXpress gear, or 3 free trades after they've opened an account and started trading!

Ready to Trade Futures?
Now you can in your optionsXpress account, side-by-side with your equity positions. More details...

About Us | Careers | Privacy | Online Security | Risks | User/Customer Agreement | Investor Relations | Contact Us | Site Map
System response and access times may vary due to market conditions, system performance, and other factors.
Options involve risk and are not suitable for all investors. Please read Characteristics and Risks of Standardized Options (PDF).
© 2000-6 optionsXpress, Inc. 1-888-280-8020 | 312-629-5455 All rights reserved. Member NASD, SIPC, CBOE, ISE, ArcaEX, BOX and PHLX

SYSTEM AND METHODS FOR FACILITATING INFORMED TRADING OF FINANCIAL INSTRUMENTS

This application claims the benefit of Provisional Application No. 60/723,829 filed Oct. 5, 2005.

FIELD OF THE INVENTION

The present invention is related to the field of prioritized management of financial instruments. More specifically, the present invention relates to an improved mode of online communication relating to automatic trade orders by which an investor is able to obtain added market information so that the investor can make more fully informed investment decisions and trade in line with those decisions. The added market information includes that which reveals relationships between a particular financial instrument, a target security, chosen by the investor and other securities such as the relationship of what one or more securities were purchased in the past generally contemporaneously with the target security.

BACKGROUND

The advent of an interactive, computerized means of communication accessible to the public via the internet has made possible a wide variety of innovative business models and practices. In recent years, entire new sectors of the domestic and international economies have appeared, involving new modes of market commerce, in particular. As a result, many entrepreneurs have begun to envision a "virtual" marketplace, having capability for conducting a vast spectrum of ordinary business transactions with greatly improved efficiency and flexibility.

Securities web sites are popular internet services that allow users to manage investment information. Financial institutions, including brokerages, which make up and/or provide access to various financial instruments, have implemented on-line services that allow investors to engage in trading over data communication networks, including the Internet. For purposes of this invention, financial instrument are securities, stocks, bonds, currencies, options, futures, commodities and derivatives thereof. As used herein, the terms trade and/or trading generally refers to transactions such as buying and/or selling. Any investor having access to the Internet may more directly engage in trading activity without having to speak to a broker to enter their orders in the marketplace for execution. Having to speak to a broker in order to place a trade can prevent the investor from making that trade in a timely fashion and thereby change the nature and degree of the risk involved in the trade. For investors who believe they have sufficient information in order to appreciate the risk involved in the trade, any added steps that delay the placement of the trade are undesired inefficiencies.

In addition to the many advantages that may be realized in standard accounting procedures, brokerage firms dealing in financial instruments have sought to expand their capabilities for improved interactive computerized communication with their individual retail account investors. Previously, prior to the appearance of the internet, trading orders from such retail investor clients could be communicated only in person or via telephone, whether using voice or fax transmission. Processing such trade orders typically would require a certain amount of lag time before execution, minimally from perhaps a few minutes to as much as several hours or more. More recently, with online communication capabilities becoming widely available, there has now opened a possibility for individual investors of financial brokerage firms to have such orders entered and executed more rapidly, often requiring less than one minute of lag time between the investor entering the order and having receipt of an online trade confirmation in reply, communicated electronically within a very few moments.

In addition, and in further contradistinction to the fairly limited range of standard and traditional types of trading modalities that were previously available to their retail clients, brokerage firms have begun to devise expanded modes of interactive communication where such orders can be made more flexible, so as to provide a greater range of possible trading formulations, allowing individuals to manage their trading accounts with their brokerage to define more innovative types of trading orders, such as to include certain conditional or contingent prerequisites that may be advantageous, in a manner that has not been technically feasible.

As an example, retail brokerage firms have traditionally allowed individual investors to specify certain trading orders with buy or sell limits, prescribing that a trade not be executed unless a certain price level for the transaction might become available in the market exchange within a certain limited time frame, usually designated as within one trading day. In a similar manner, such investor trading orders might ordinarily be further conditioned as buy stop, or sell stop orders. Whereas a buy limit order requires that a purchase not be affected above a certain price, a buy stop order requires buying only at a maximal price level. In the case of sell orders, whereas a sell limit order requires that a sale of financial instrument not be affected below a certain price, a sell stop order requires that the sell order be entered only after accession of a certain price.

Most brokerage firms would also allow investor orders to request orders where the two conditional contingencies, the limit criterion and the stop-price criterion, are combined. An individual investor might thereby instruct the brokerage firm to either buy or sell at a specified price or better after the market price has advanced or declined beyond a given stop price.

Brokerage firms establishing an interactive or online computerized trading capability as part of their financial services offered to the public might additionally allow their retail investors to specify another type of conditional trading order, involving the designation of a buy or sell stop price level that can be made variable, in accordance with the fluctuations of the market. Such initially non-activated or conditional orders, usually designated as "trailing stop" orders, are defined as buy or sell orders imposing two additional contingencies, involving the market price at the time when the order was entered, and a specified trailing range, or price differential between the current market price and the trigger or activation price. Market price fluctuation beyond such range then causes such orders to become immediately activated, as market orders to buy or sell.

For practical reasons, and because individual traders would usually request a trailing stop order only as part of a protective or defensive strategy, such trailing stops typically would not be combined with any additional criteria involving buy or sell stops, but rather become designated as orders to be executed at the current market price, whenever the trading market price goes beyond, either above or below, the price differential specified by the range of the trailing stop. Thus, the trigger or activation price level for a trailing sell stop can move higher as the market price increases, but it cannot be moved lower from the point of the highest ongoing market price less the trailing differential. Similarly, a designated trigger price for a trailing buy stop can only move lower as the market price decreases, but cannot be adjusted to move any higher than the ongoing current market price minus plus the trailing differential.

As a matter of standardizing procedures, a brokerage firm may impose additional restrictions whereby such contingent orders might be held static so as not to become activated for execution at the current market price for some briefly limited period of time subsequent to activation of the trigger point, perhaps a period of one minute or less. Another restriction imposed by brokerage firms might require that such contingent orders only be specified or entered by investors at certain pre-determined incremental price levels, defined usually either in dollar amounts or fractions thereof, or as a price range limited within an incremental or fractional percentage of the current market price, for any given traded issue or security.

Brokerage firms establishing an interactive or online computerized trading capability as part of their financial services offered to the public might additionally offer their retail investors recommendations, or suggestion services. Two types of recommendation services are conducted through what is known as content-based filtering and collaborative filtering.

Content-based filtering services attempt to identify items similar to items that are of interest to the user by assessing the item content. Typically, content-based filtering services do not provide a mechanism for evaluating the quality or popularity of an item. Collaborative filtering services attempt to identify items to users based on the interests of a community of users. Typically, collaborative filtering services are based on profiles of individual users—similar profiles are used to generate recommendations.

As the extended capabilities of online communication becomes more commonly available, more elaborate trading strategies and more innovative forms of interactive trading becomes possible.

As more elaborate trading strategies and more innovative forms of interactive trading becomes possible, investors have greater and greater need to identify the risk involved in the potential purchase of any security and, after purchasing the security, efficiently manage the risk inherent in any financial portfolio. The present invention satisfies the demand.

SUMMARY

The invention relates to an improved means for interactive computerized communications having a facilitated capability for order entry and order execution, and providing an enhanced range of trading forms and methods to clients of brokerage firms dealing in financial instruments. Financial instruments are securities, stocks, bonds, currencies, options, futures, commodities and derivatives thereof. The present invention is described in reference to a security, although any financial instrument can be subject to the present invention. The use of the term security is for discussion purposes and is in no way intended to limit the present invention.

In particular, the invention relates to a type of interactive computerized system and methods including an improved mode of online communication in which a retail investor can gain access to historical trading data that allows the investor to determine the relationship that a certain security of interest to the investor (termed "target security" for purposes of this application) has with other securities. One such relationship is what other security or securities were purchased generally contemporaneously with the purchase of the target security. Generally contemporaneously is defined by a duration of time. In one embodiment, generally contemporaneously means one security or securities were purchased within one day (24 hours) of the purchase of the target security. In other embodiments, the duration of time can be less than one day (24 hours) or greater than one day (24 hours) between the trades of a security or securities and the target security. The investor can designate the duration of time. Alternatively, the Company, third party brokers, or exchanges or any other third party can designate the time between when a security is purchased and when the target security is purchased.

With such information, the investor may gain knowledge of how the target security is generally viewed in the marketplace and what other opportunities may exist for purchase. Through this information, the investor may gain added confidence in the merits of the investor's decision to purchase or not purchase a certain security and overall become a more fully informed investor. The investor may feel more secure in the investor's decision to rely or not to rely on the opinion of a broker or advisor regarding the investor's interest in a target security.

It is an object of the present invention to facilitate the transactional capabilities of such interactive trading services, by providing retail brokerage investors with an increased range and variety of selectable trading strategies.

It is another object of the invention to provide information to a retail brokerage investor so that the investor can make a more fully informed purchasing decision about a target security. The information includes historical data by which the investor can identify the relationship that the target security may have with one or more additional security. For example, the investor may be able to determine that when a target security is purchased, what one or more additional security is purchased generally contemporaneously with same. This relationship information is termed for purposes of this application also "trading patterns information". The trading patterns information may be a grouping of the securities purchasing decisions made by the same investor that has interest in a certain security. By accessing this grouping, the investor can determine what other security or securities the investor purchased generally contemporaneously with the past purchase of the target security through online generally automatic communications and thereby without the need to compile this information from more standard sources (such as records maintained for other purposes or even hard copies in the investor's files) that document all the security purchases made by the investor in the past. The trading patterns information may also be a grouping of the securities purchasing decisions made by all of investors in the same brokerage firm employing the system and methods of the present invention. Such large grouping of data would be without that specific information by which the identity of the other investors can be gleaned and therefore the privacy interests of the company's private investors would be protected. Additional embodiments of the present invention include trading data obtained outside the company through access provided through consensual arrangements with third party sources such as other brokerage firms.

The present invention will be further appreciated, and its attributes and advantages further understood, with reference to the detailed description below of some presently contemplated embodiments, taken in conjunction with the accompanying drawings, in which:

DRAWINGS

FIG. 7 is an embodiment of a confirmation that an order was placed according to the present invention;

Figure 12:
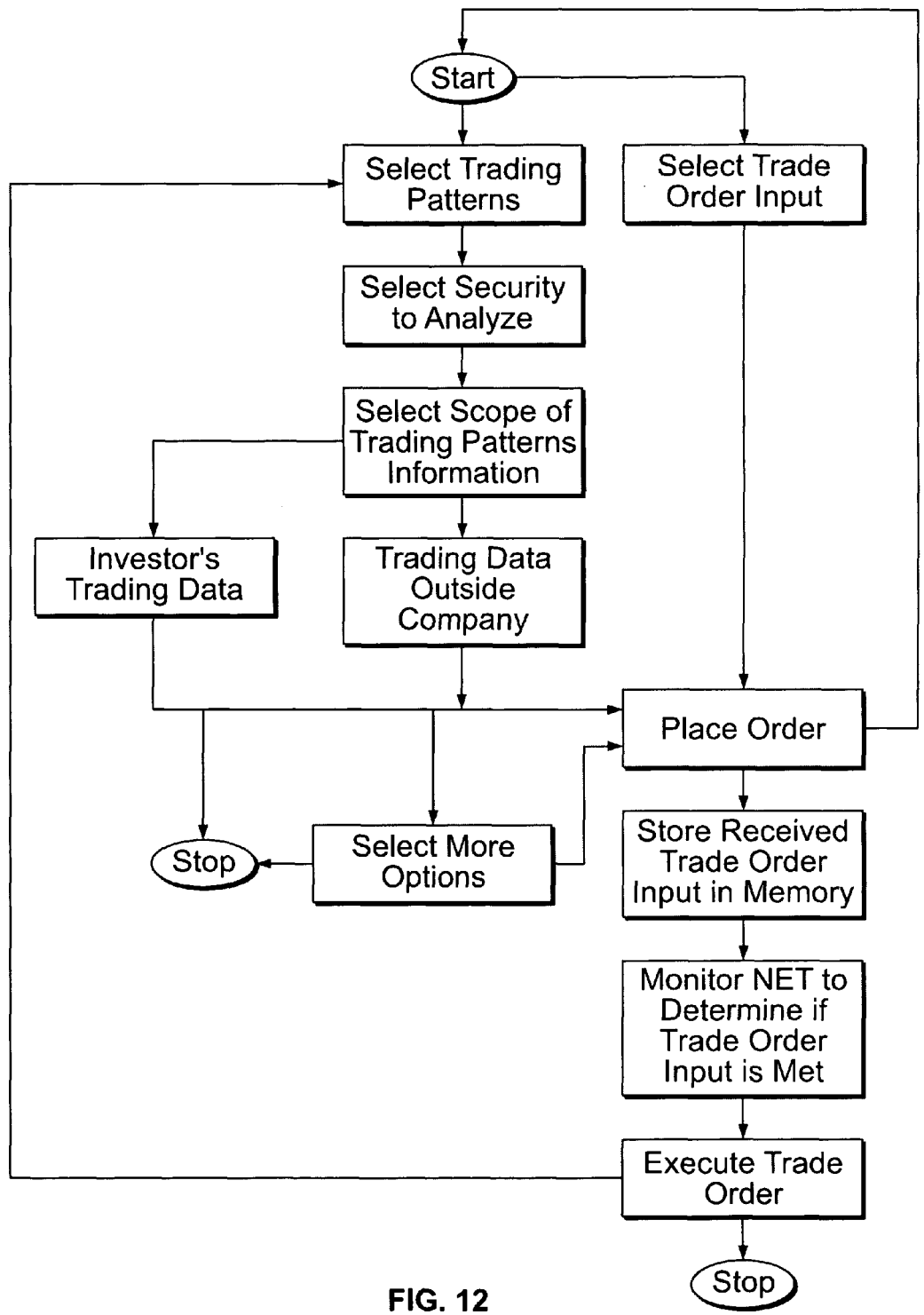
Figure 13:
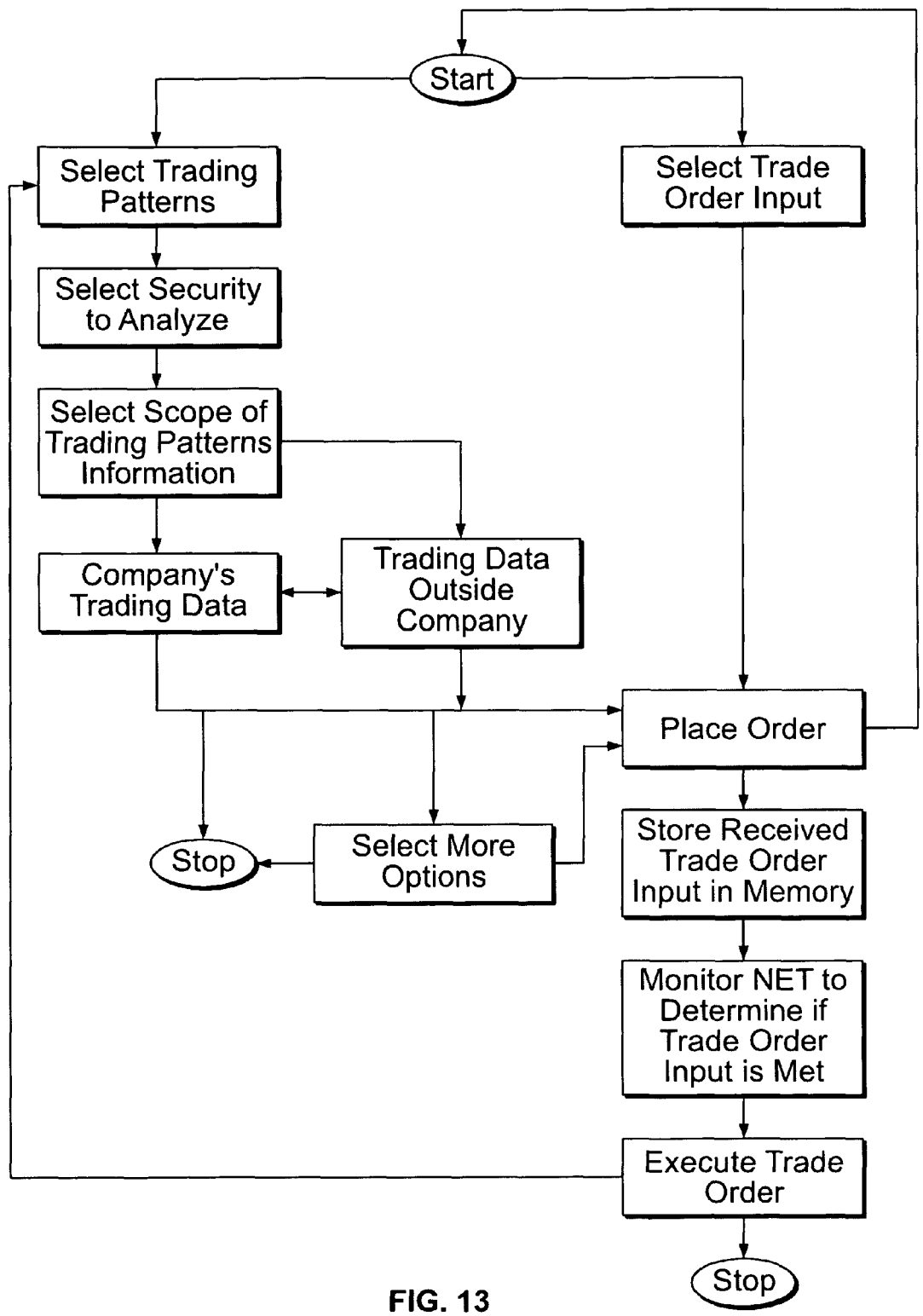

FIG. 12 is another embodiment of the system according to the present invention in which data concerning the past trades of the investor using the system and other investors outside the company may be accessed; and FIG. 13 is another embodiment of the system according to the present invention in which data in which the investor using the system may access data regularly in the past trades of those within and outside the company may be accessed.

DETAILED DESCRIPTION

The present invention pertains to order entry and execution of financial instruments. For purposes of this application, a financial instrument are any type of securities, stocks, bonds, currencies, options, futures, commodities and derivatives thereof that can be traded. Although the present invention is described in reference to a security, any financial instrument is contemplated. Orders typically define the security symbol, action, quantity, price and duration. The security symbol is the ticker symbol used to designate the security in the market. Markets include, but are not limited to, the Chicago Mercantile Exchange (CME), Chicago Board Options Exchange (CBOE), International Securities Exchange (ISE), Boston Options Exchange (BOX), Philadelphia Stock Exchange (PHLX), New York Mercantile Exchange (NYMEX), Archipelago Exchange (ArcaEx). The New York Stock Exchange (NYSE), American Stock Exchange (AMEX), Pacific Exchange (PCX) and National Association of Securities Dealers Automated Quotations (NASDAQ). A market order is an investor order that is to be executed as quickly as possible at the prevailing market price. An investor for purposes of this application may be a private individual, a business, or a legal entity, for example, a trust.

Bid is the price point where a buyer is willing to purchase a given stock or option contract. This is the price individual investors typically receive when they sell stock or options at the market. For example, if the bid-ask spread for an option is 4¾-5, an investor looking to sell at-the-market will receive the current bid of 4¾. Ask or ask price is the price point where a seller would be willing to sell a given stock or option contract. Also known as the offer, this is the price individual investors pay when they place a market order. For example, if the bid-ask spread for an option is 3-3¼, the individual investor can expect to pay the ask price of 3¼ to buy the contract. Conversely, the same person looking to sell the contract will get the bid price of $3. The ¼ point spread is earned by the market maker.

Trading actions are the events that occur to the defined security and are selected by the investor. Trading actions include: buy, sell, buy to open, buy to close, sell to open, and sell to close. Actions are generally used in futures/options investing to distinguish between establishing versus closing a position. Buy is to exchange, trade or purchase for money or its equivalent. Sell is to exchange or deliver for money or its equivalent. "Buy to close" is an order entered to close a short position. Consequently, a "sell to open" order is always used to open a short position. A "sell to open" order is entered to establish a new short position. Consequently, a "buy to close" order is always used to close a short position. "Buy to open" is an order entered to establish a new long position. Consequently, a "sell to close" order is always used to close a long position. "Sell to close" is an order entered to close a long position. Consequently, a "buy to open" order is always used to open a long position.

Quantity is the amount of a security to be traded, for example shares. An "all or none" (AON) feature associated with quantity allows a trader to buy or sell a specified number of contracts at a single price. The number of contracts must meet or exceed a predetermined threshold level, and these orders must be executed during pit trading sessions. All or none orders are routed to the primary exchange where they are manually held and executed when eligible. Furthermore, these orders are not reflected in the bid/ask quotes. Generally, AON is not recommended on orders of less than 20 contracts since order execution may be affected.

Price includes the type of order. A market order is executed as quickly as possible at the prevailing market price. A limit order allows an investor to buy or sell a predetermined number of shares at a specified price (or better than specified price, if available). Limit orders guarantee a price (or better price than specified), but do not guarantee an execution. A stop order is a contingency order to buy or sell a stock when the market reaches a particular level. When the price reaches that level specified in the stop order, the stop order becomes a market order and is executed at the best possible price. A stop-limit order is like a stop order. This order will be triggered by a move up or down to a particular price level. Once that level is reached, the order becomes a limit order, which must be executed at a specific price. In contrast, a regular stop order will be executed at the market price rather than at a specified price. A "market-not-held-order" is an order issued by an investor allowing the floor broker to use his or her best judgment regarding the price and timing of the trade. A "market on close" is an order executed or triggered just prior to the close of the market. Finally, a "buffered limit" is the desired limit price that will be applied as an offset to the triggered quote, at the time the order is sent to the exchange.

Duration is the length of time the order remains open for fulfillment. A day order is an order to execute a trade that will automatically be cancelled at the end of the trading day if it has not been filled. A "good-until-cancelled (GTC) is an order to execute a trade that remains open until the trade is completed or the investor cancels the order. Unlike a day order, which expires at the end of a trading day, a GTC order will remain in effect until it is filled or cancelled.

The system 21 for use with an embodiment of the present invention includes a network enabled device, a network server module and a database. The network enabled device, for example computer, includes a device having components to couple to a network such as the Internet. The network enabled device includes a communication port and processor, and may also include memory and a display.

One preferred embodiment of the present invention is a system 21 that includes a series of displays 31, or screens, that may be made available online and by which an investor can identify a certain security, otherwise referred to as target security, first place an order—thereby setting the parameters and conditions under which the investor will be willing to purchase the security—or obtain trading patterns information for the target security before placing the order, and if the order is placed first, then obtain trading patterns information for it leading possibly to the placement of an order or orders for one or more additional securities gleaned by the investor from the trading patterns information. This preferred embodiment can include a screen, or display, having a tool bar and a button which by clicking thereon the trading patterns information can be accessed.

Figure 1:
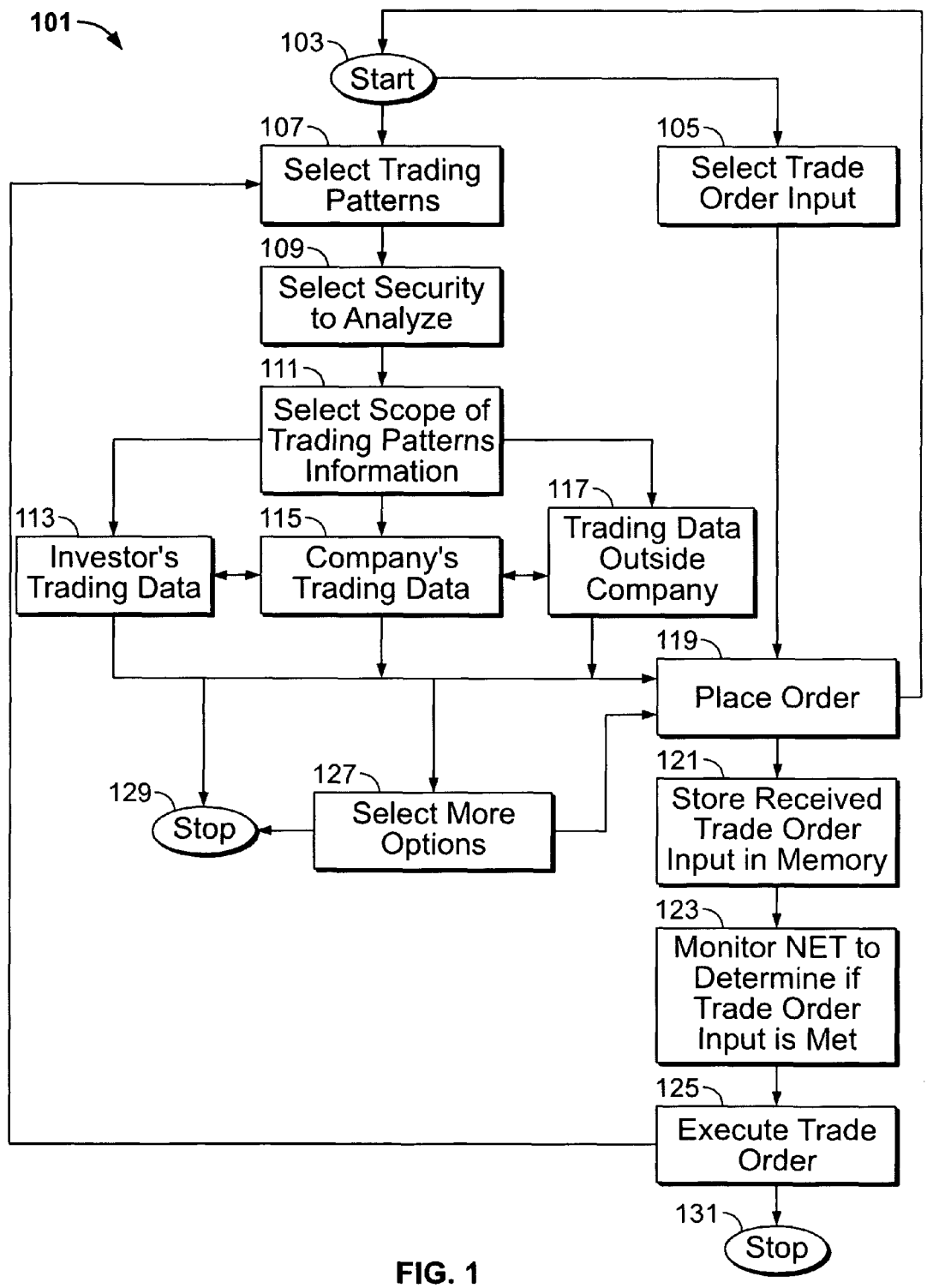
FIG. 1 is one embodiment of the system according to the present invention shown as trading pattern information flowchart.

FIG. 1 is a flowchart 101 according to the present invention showing the operation of the system by which an investor can select a certain security, or target security, obtain trading patterns information about it from an online database, and, if the investor so chooses, place an order for the target security or one of the securities identified by the investor, for example, from the trading patterns information. The trading patterns information concerns past trades, which the investor can identify by grouping the information within the database for analysis. Trading patterns information concerning past trades includes data concerning the trades that the investor accomplished generally contemporaneously with past trades of the target security as wall as data concerning trades accomplished by investors different from the investor who identified the target security.

Figures 2, 4:
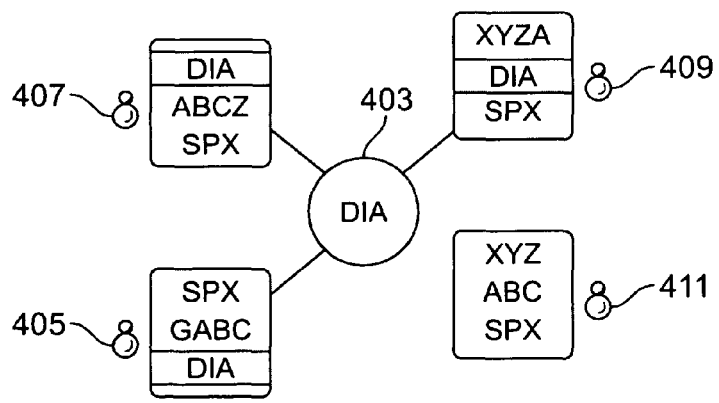
FIG. 2 is an embodiment of an order screen for online order execution according to the present invention.
FIG. 4 is a graphical rendition of trading pattern information according to the present invention.

The system 21 shown as a trading pattern information flowchart 101 in FIG. 1, allows the investor to select to input a trade order 105 or view trading patterns information 107. If a the investor inputs a trade order 105, the information is input on an order screen 33 for online order execution as shown in FIG. 2. The online order screen 33 initiates the order of a financial instrument, for example either a security, option or stock. The order screen 33 includes criteria of: symbol 203, action 205, quantity 207, price 209, duration 211, routing 213 and advanced orders 215.

Symbol 203 is the security to be traded. Actions 205 include "buy", "sell", "sell short", "buy to cover" for stocks and "buy to open", "buy to close", "sell to open" and "sell to close" for options. Quantity 207 is the amount of shares to be traded. Price 209 includes the type of order (i.e., market, limit, stop, sop limit, market on close) and, if the type of order selected requires, the amount in points (i.e., dollars). The duration 211 can be a day order or good until cancelled by the investor. Routing 213 is the execution venue in which the order is placed, i.e., the New York Stock Exchange (NYSE), Chicago Mercantile Exchange (CME), Chicago Board Options Exchange (CBOE), International Securities Exchange (ISE), Boston Options Exchange (BOX), Philadelphia Stock Exchange (PHLX), New York Mercantile Exchange (NYMEX), Archipelago Exchange (ArcaEx). Advanced orders 215 offer the investor various trading strategies. Advanced orders 215 include: "contingent order", "one triggers other" (OTO), one cancels other" (OCO) and "one triggers two" (OT2).

After the investor inputs a trade order 105 on display 33 (FIG. 2), the trade is entered 119 and the investor can either select to input another trade order 105 or view trading patterns information 107 for a particular security.

The present invention is a system that provides information based on trading patterns. If the investor selects to view trading patterns information 107, trading pattern display 35 (FIG. 3) allows the investor to select from a plurality of securities, a target security to analyze 109. An online database is accessed including information concerning past trades in the securities. As shown in FIG. 1, along with the target security selected to analyze 109, the investor identifies a grouping of the information within the database for analysis, or scope of the trading patterns information 111. Trading patterns information can be obtained from trading data concerning trades that the investor accomplished generally contemporaneously with the past trades of the target security 113, trading data concerning trades accomplished by investors within a particular company 115, but different from the investor who identified the target security, and trading data of other investors external to a company's trading service 117. In one embodiment, generally contemporaneously means one security or securities were purchased within one day (24 hours) of the purchase of the target security. In other embodiments, the duration of time can be less than one day (24 hours) or greater than one day (24 hours) between the trades of a security or securities and the target security. The investor can designate the duration of time between trades while identifying the scope of the trading patterns information. Alternatively, third party brokers or exchanges or any other third party can designate the time between when a security is purchased and when the target security is purchased. A customer can choose to be excluded from trading patterns information. Additionally, trading patterns information theoretically could be obtained from third party brokers or exchanges or any other third party with order and account pairs within the information passed to a particular company, for example optionsXpress.

Figure 3:
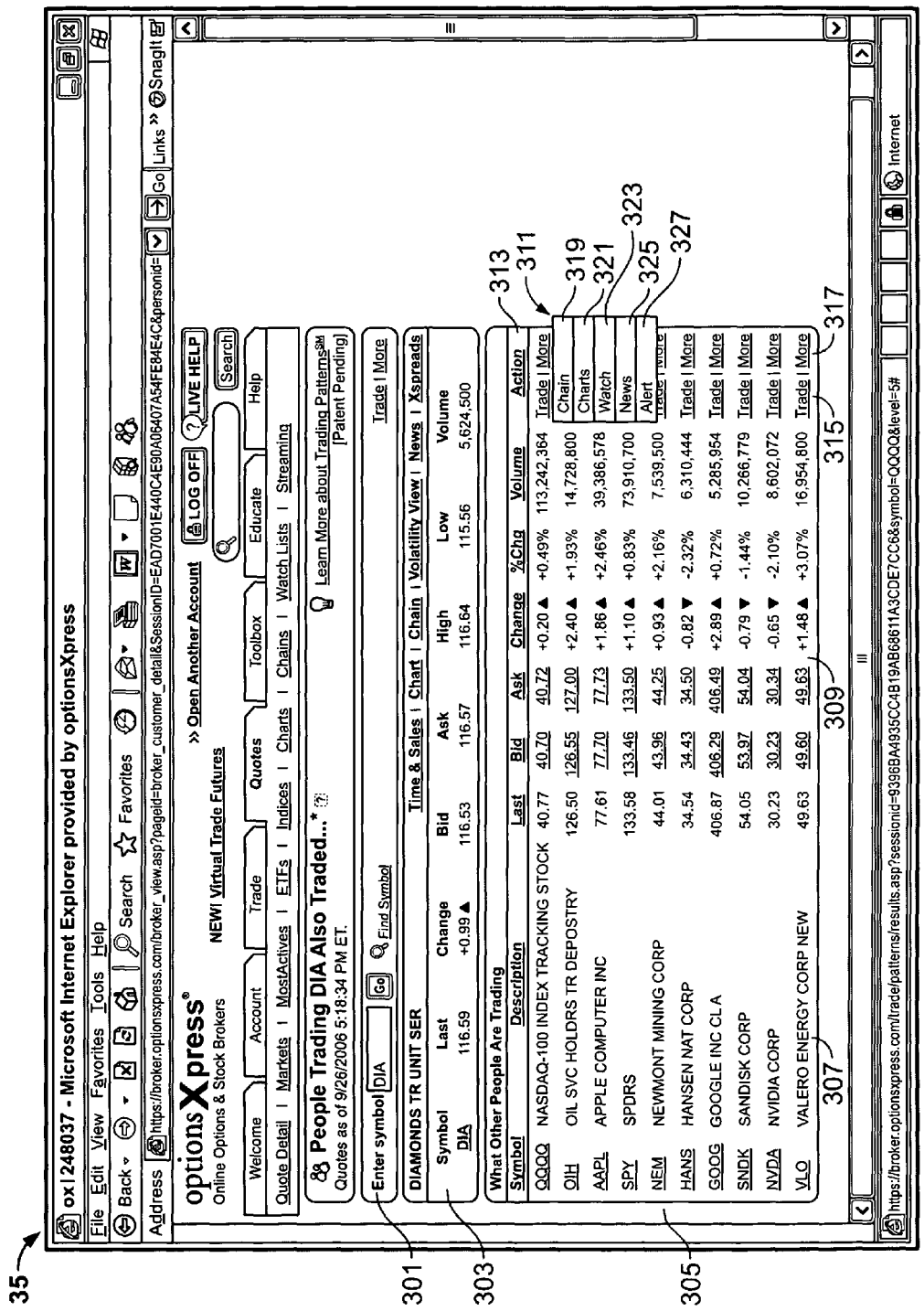
FIG. 3 is another embodiment of an order screen for online order execution and that displays trading patterns information according to the present invention.

To generate a set of trading patterns securities for a given investor, the service retrieves from a database the similar securities corresponding to the target security known to be of interest to the investor, and then appropriately combines these groupings to generate a display of securities as shown in FIG. 3. The grouping of securities is determined by the scope of the trading pattern desired. Again, trading patterns information includes the investor's trading data, the company's trading data and trading data outside the company. Depending on the trading pattern selected, the grouping of securities is analyzed to determine which one or more of the securities were traded generally contemporaneously with the target security.

FIG. 3 is a display of securities according to the trading patterns information selected. The display can be organized according to frequency of the security traded. It is further contemplated the display can be organized by alphabetizing the security. Display 35 is shown upon the request for a pattern. Trading pattern display 35 includes criteria of: symbol 301, quote 303, and the data pertaining to the trading pattern 305.

The system 21 reveals one or more securities—stock, bonds, options, etc.—that were purchased in the past generally contemporaneously with the purchase of the same target security. When an investor requests trading patterns information for a given symbol 301, (DIA stock) the trading patterns system 21 is activated to provide a listing 305 of other symbols for securities traded by customers who also placed orders for the initial DIA stock. Thus, the trade activity of an individual investor correlates to a trading pattern (i.e. selling DIA stock) of other stocks and options.

The listing 305 of other symbols for securities includes criteria of: description 307, market conditions 309 (i.e., last, bid, ask, change, change percent, volume) and action 313. The action criteria 313 allows the investor to input and order, i.e., "trade" 315, or select more options 317. Selecting more options 317 opens a box 318 that includes the criteria of: chain 319, chart 321, watch 323, news 325 and alert 327.

The system 21 allows an investor to set an alert 327 for a particular security. The investor can also select an action 313 for a particular security such as trade 315, chain 319, chart 321, or watch 323. Trade 315 is the buying and selling of contracts (stock or option). Chain 319 is a way of quoting options prices through a list of all of the options for a given security, including the various strike prices, expiration dates, and whether they are calls or puts. Chart 321 allows for a graphical display of the trading history of the stock or option. Watch 323 allows the investor to monitor the activity of a particular stock or option.

Figure 5:
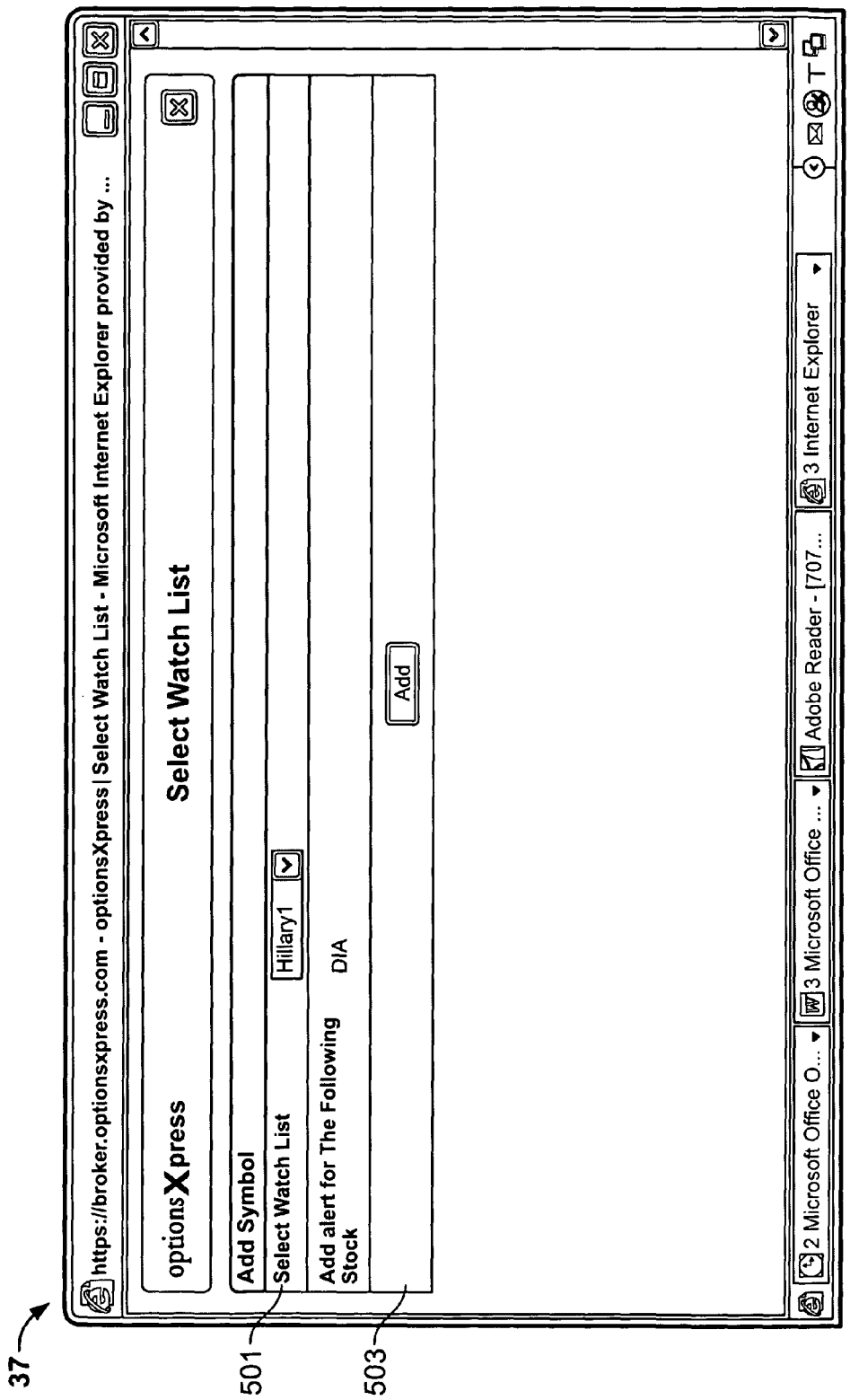
FIG. 5 is an embodiment of a watch screen for online monitoring of a particular stock or option according to the present invention.

If the investor selects the action 313 to watch 323 a particular security, FIG. 5 is an embodiment of a watch display 37, or screen, for online monitoring of a particular security, for example stock or option. A pull down menu of each watch list 501 is provided. Upon selecting a particular watch list 501, the investor can add the DIA stock, for which the trading pattern was requested.

Figure 6:
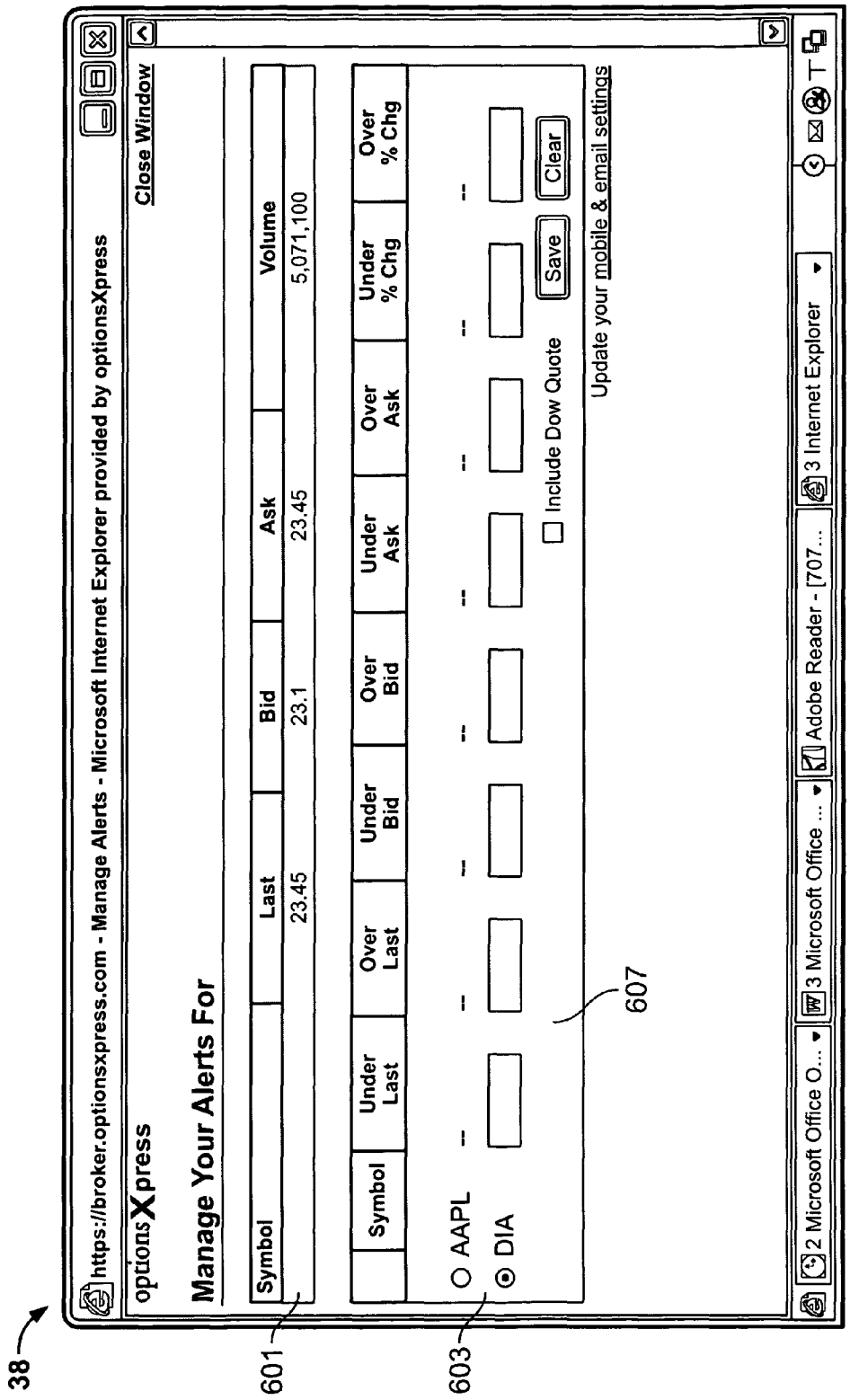
FIG. 6 is an embodiment of an alert screen for online monitoring of a particular stock or option according to the present invention.

If the investor selects the action 313 to alert 327 a particular security, FIG. 6 is an embodiment of an alert screen 38 for online monitoring of a particular stock or option. The symbol 601 for the stock of which the trading pattern was requested, DIA, is shown with the market conditions 605 (i.e., last, bid, ask, volume). The investor can set market conditions 607 (i.e., under last, over last, under bid, over bid, under ask, over ask, under percent change, over percent change) for the symbol 603.

If the investor selects the action 313 of trade 315, FIG. 7 is an embodiment of a trade confirmation screen 39. This screen 39 confirms to the investor that the order was placed. This same screen 39 appears when an investor inputs information on an order screen 33 for online order execution as shown in FIG. 2.

FIG. 4 is a graphical rendition of the system providing information based on trading patterns information. Once an investor selects to view trading pattern information of a target security, the system 21 accesses an online database of information from other investors based upon the security of the order or request. For example, an investor places an order through the use of a data entry screen shown such as the one shown in FIG. 2 for stock DIA 403. The system 21 accesses the database according to the target security ordered or requested by the investor. The investor identifies a grouping of the information, i.e., the trading patterns of the same investor, other investors, and/or third party financial strategists based on the stock or option to be traded. Investors 405, 407 and 409 are analyzed based upon the securities that were traded generally contemporaneously with the stock DIA. Investor 411 is not part of the display generated (FIG. 3) because no security was traded generally contemporaneously with the target security, e.g., investor 411 never traded the target security. The system 21 can analyze executed and non-executed orders.

The system 21 groups securities through analysis based on current data, historical data or strategist's analyses. The similarity between two securities is preferably measured by determining the number of investors that have an interest in both securities relative to the number of investors that have an interest in either security. For example, security X and security Y are similar because a relatively large portion of investors that traded one security also traded the other security.

The previous orders—history—of securities and their respective actions that an investor has entered and/or executed are assembled by tracking and storing the information. This information is stored not only for each individual investor, but also for all investors using the particular trading and securities management system. The information can be stored from third party financial strategists as well. An algorithm utilizes the data to analyze and display an output to the investor after the investor has entered/executed an order.

Turning back to FIG. 1, after the trading patterns information 113, 115, 117 of the security is selected, the investor could exit 129 the system 21, select more options 127 to place a trade (discussed above), or directly enter the trade 119. After the trade is entered 119, the investor can yet again select to input a trade order 105 or view trading patterns information 107 of a selected security. Once the trade is entered 119, the system 21 stores the input into memory 121. The system 21 then monitors the Internet to determine if the trade input is met 123. Once the trade input is met, the trade is executed 125. The investor then exits the system 21 or returns to the trading pattern screen 35 (FIG. 3).

Figure 8:
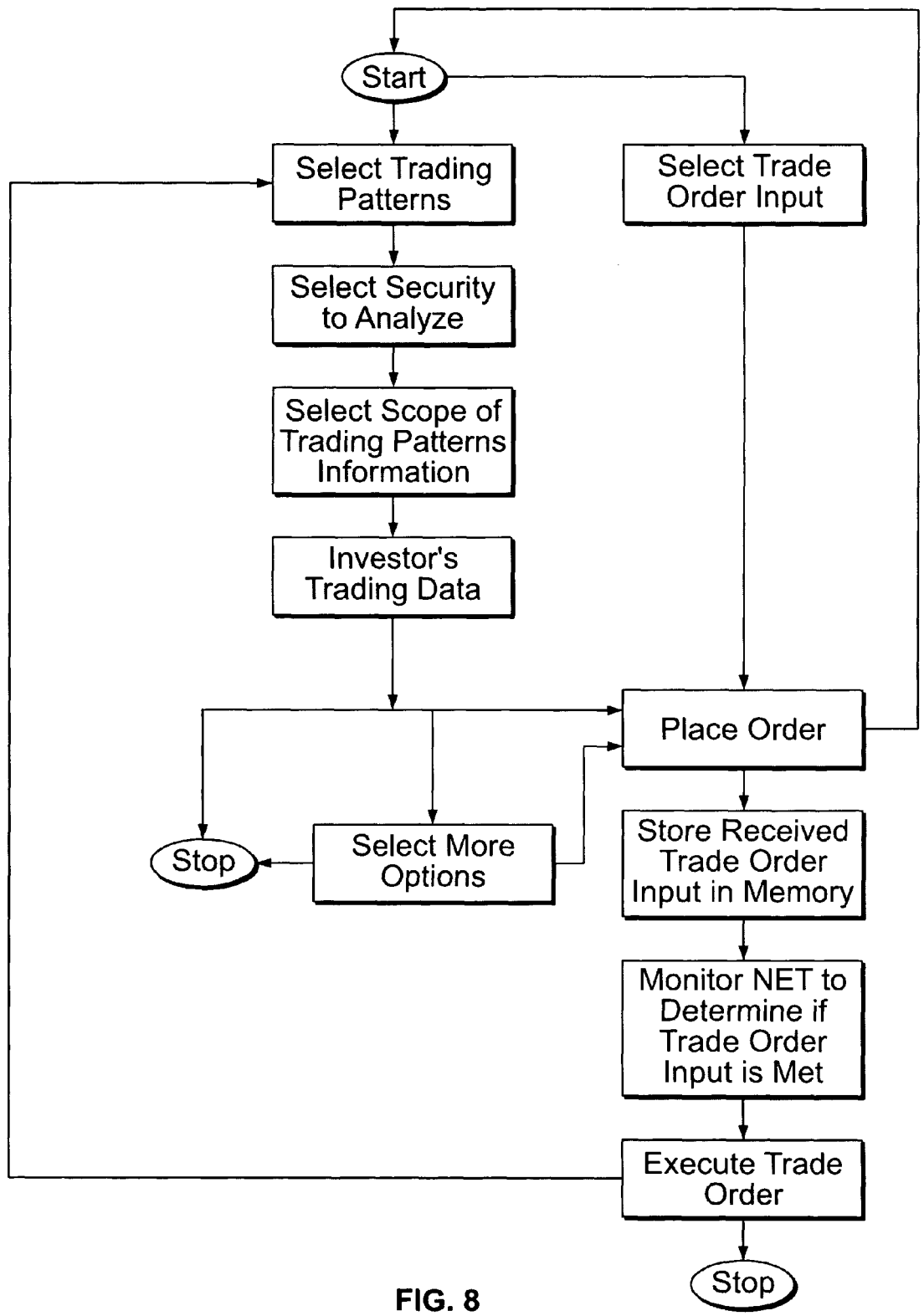
FIG. 8 is another embodiment of the system according to the present invention in which data concerning the investor's past trades may be accessed.
Figure 9:
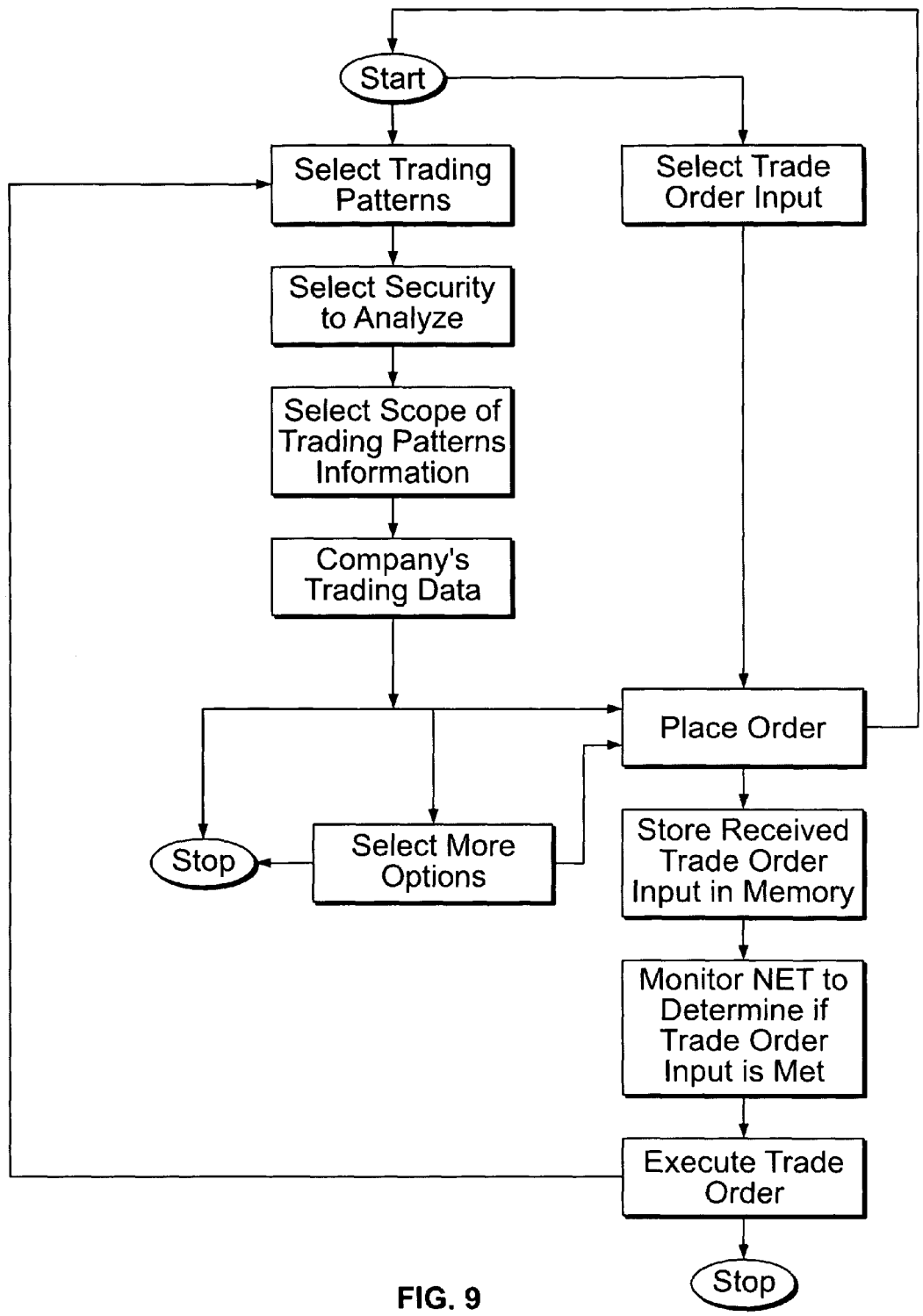
FIG. 9 is another embodiment of the system according to the present invention in which data concerning the past trades of a plurality of investors may be accessed.
Figure 10:
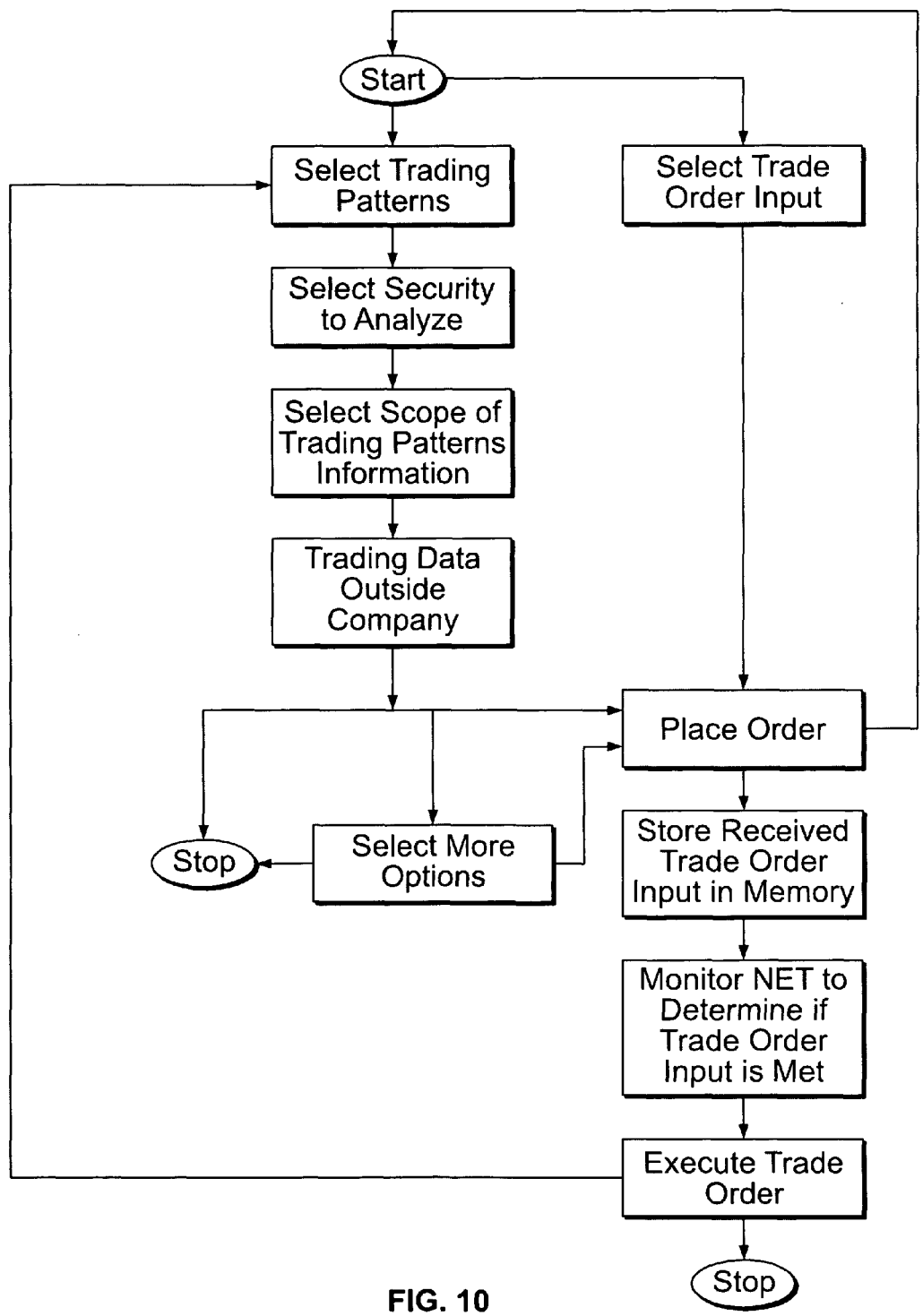
FIG. 10 is another embodiment of the system according to the present invention in which data concerning the past trades outside of a particular company may be accessed.
Figure 11:
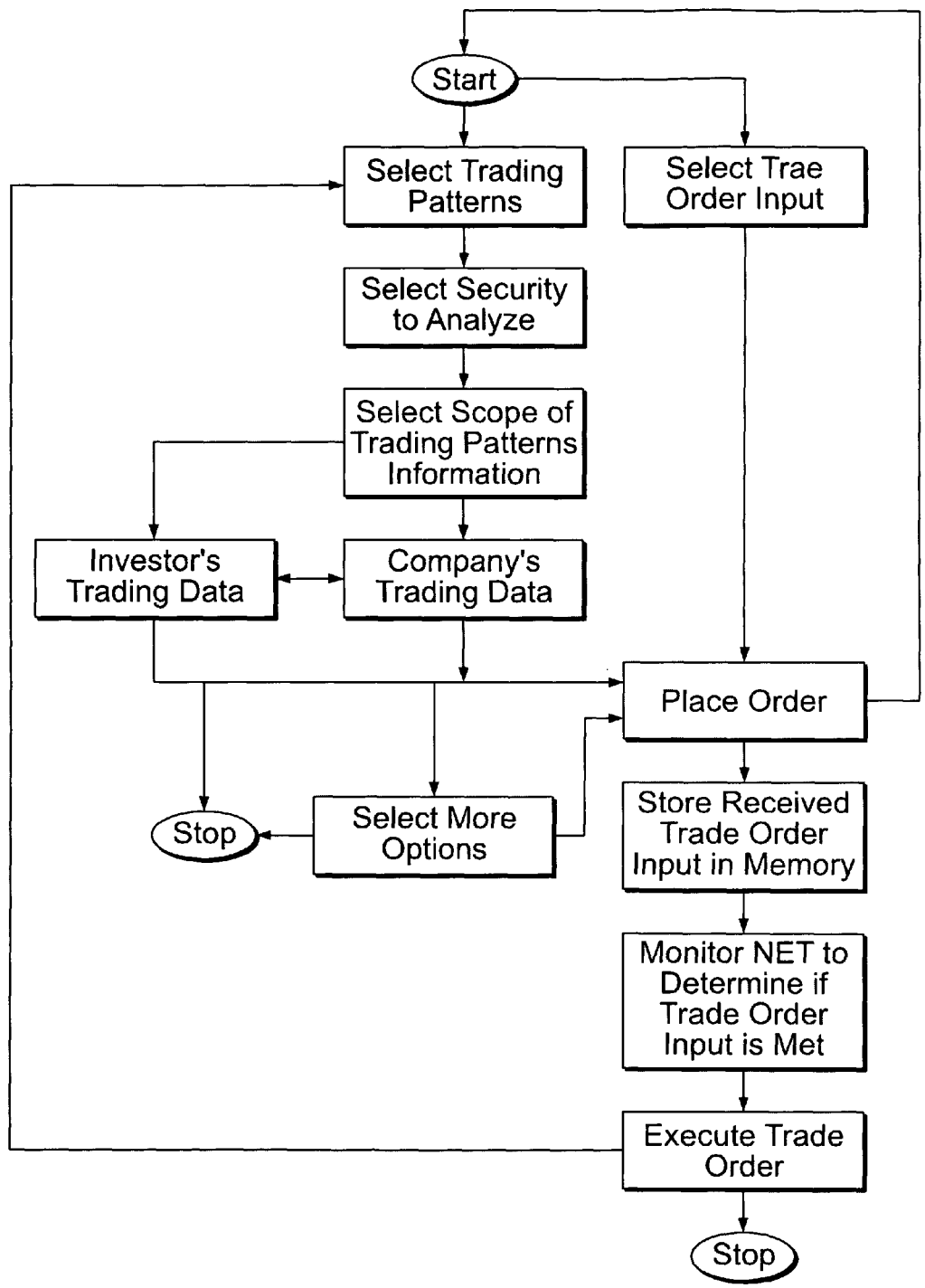
FIG. 11 is another embodiment of the system according to the present invention in which data concerning the past trades of the investor using the system and other investors at a company may be accessed.

In addition to FIG. 1, FIGS. 8-13 are various trading pattern flowcharts according to the present invention. The scope of the trading patterns can be analyzed in various strategies. As discussed above with respect to FIG. 1, the scope of the trading patterns information includes trading data of the past trades of the investor currently using the system, trading data of past trades of other investors within a particular company, and trading data of past trades outside the particular company. FIG. 8 is trading pattern information that analyzes data concerning the past trades of the investor currently using the system. The trading pattern of FIG. 9 analyzes data concerning the past trades of a plurality of investors within a particular company. The data concerning the past trades outside of a particular company is analyzed in the trading pattern of FIG. 10. FIG. 11 is a trading pattern that includes the scope of both the data concerning the past trades of the investor using the system and other investors at a particular company. FIG. 12 is a trading pattern that includes the scope of both data concerning the past trades of the investor using the system and other investors outside the company. FIG. 13 is a trading pattern that analyzes the data of past trades of those within and outside the company.

It is further contemplated that a set of trading action inputs (i.e. buy, sell, buy to open, buy to close, sell to open, sell to close) may also be generated in the same fashion as the trading patterns information. The service retrieves from a database the similar actions corresponding to the actions given to securities already known to be of interest to the investor, and then appropriately combines these lists to generate a list of possible actions.

Thus, while the invention has been disclosed and described with respect to certain embodiments, those of skill in the art have recognized modifications, changes, other applications and the like which will nonetheless fall within the spirit and ambit of the invention, and the following Claims are intended to capture such variations.

What is claimed is:

1. A system by which an investor can automatically and through online communications identify possible additional trading opportunities relative to a security identified as a target by the investor, said system comprising:

a database comprising data regarding past trades by a plurality of investors of each security in a group of securities, wherein the database includes the past trades of the investor, the past trades of a plurality of investors within a trading service company, and the past trades of a plurality of investors external to the trading service company;

a target security entry display by which the investor identifies a target security selected from the group of securities; and a processor that determines by review of the database which securities in the group of securities were traded relative to the target security designated by an investor selection of a time period between when the target security was traded and each security in the group was traded and prepares a display of information from the review so that the investor identifies any additional trading opportunities relative to the target security, wherein the processor also measures a similarity between two securities of the group of securities by determining a first number of investors that have an interest in the two securities relative to a second number of investors that have an interest in one of the two securities.

2. The system according to claim 1, further including an order display by which the investor identifies and communicates an offer to purchase the target security or another security.

3. The system according to claim 1, wherein said processor further determines information related to non-executed trades in the group of securities.

* * * * *